United States Patent
Anglin et al.

(10) Patent No.: US 7,904,820 B2
(45) Date of Patent: Mar. 8, 2011

(54) USER MANAGEMENT OF DISPLAY PROPERTIES OF SHARED DISPLAY WINDOW IN SHARED DISPLAY WINDOW ENVIRONMENT

(75) Inventors: Howard Neil Anglin, Austin, TX (US); Frank Anthony Nuzzi, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 858 days.

(21) Appl. No.: 11/768,052

(22) Filed: Jun. 25, 2007

(65) Prior Publication Data
US 2008/0320399 A1    Dec. 25, 2008

(51) Int. Cl.
G06F 3/00 (2006.01)
(52) U.S. Cl. ......... 715/751; 715/753; 715/757; 715/759; 709/204; 709/205; 709/206; 709/207
(58) Field of Classification Search .......... 715/759, 715/751, 753, 757; 709/204–207
See application file for complete search history.

(56) References Cited

U.S. PATENT DOCUMENTS

| | | | | |
|---|---|---|---|---|
| 5,933,597 | A * | 8/1999 | Hogan | 709/204 |
| 6,223,212 | B1 * | 4/2001 | Batty et al. | 709/204 |
| 6,285,363 | B1 * | 9/2001 | Mairs et al. | 715/751 |
| 6,570,590 | B1 * | 5/2003 | Dubrow et al. | 715/751 |
| 7,089,278 | B1 * | 8/2006 | Churchill et al. | 709/203 |
| 2003/0085922 | A1 * | 5/2003 | Wei | 345/751 |
| 2004/0012538 | A1 * | 1/2004 | Bhogal | 345/1.1 |
| 2004/0024819 | A1 * | 2/2004 | Sasaki et al. | 709/205 |
| 2004/0024890 | A1 * | 2/2004 | Baek et al. | 709/229 |
| 2004/0103151 | A1 * | 5/2004 | Ettinger et al. | 709/205 |
| 2004/0179036 | A1 * | 9/2004 | Teplov et al. | 345/751 |
| 2004/0199514 | A1 * | 10/2004 | Rosenblatt et al. | 707/10 |
| 2004/0218036 | A1 * | 11/2004 | Boss et al. | 348/14.08 |
| 2004/0221010 | A1 * | 11/2004 | Butler | 709/204 |
| 2005/0111711 | A1 * | 5/2005 | Deaven et al. | 382/128 |
| 2005/0132299 | A1 * | 6/2005 | Jones et al. | 715/759 |
| 2005/0223343 | A1 * | 10/2005 | Travis et al. | 715/862 |
| 2006/0041846 | A1 * | 2/2006 | Masselle et al. | 715/793 |
| 2006/0075348 | A1 * | 4/2006 | Xu et al. | 715/730 |
| 2006/0080432 | A1 * | 4/2006 | Spataro et al. | 709/224 |
| 2006/0136828 | A1 * | 6/2006 | Asano | 715/733 |
| 2006/0253797 | A1 * | 11/2006 | Madan et al. | 715/792 |
| 2006/0271877 | A1 * | 11/2006 | Theurer | 715/781 |
| 2007/0078953 | A1 * | 4/2007 | Chai et al. | 709/219 |
| 2007/0239828 | A1 * | 10/2007 | Patton et al. | 709/204 |
| 2007/0282793 | A1 * | 12/2007 | Majors et al. | 707/2 |
| 2007/0294626 | A1 * | 12/2007 | Fletcher et al. | 715/751 |
| 2008/0222295 | A1 * | 9/2008 | Robinson et al. | 709/227 |

* cited by examiner

*Primary Examiner* — Weilun Lo
*Assistant Examiner* — Tuyetlien T Tran
(74) *Attorney, Agent, or Firm* — Yee & Associates, P.C.; David A. Mims, Jr.

(57) ABSTRACT

Computer implemented method, system and computer usable program code for managing display properties of a shared display window in a shared display window environment, wherein the shared display window environment includes a host for managing display properties of shared display windows in the shared display window environment, and at least one user for receiving shared display windows on a user display. In response to a request of a user of the at least one user, at least one shared display window is detached from the shared display window environment, and the requesting user is enabled to manage display properties of the detached at least one shared display window on the user display of the requesting user independent of the shared display window environment.

18 Claims, 3 Drawing Sheets

USER MANAGEMENT OF DISPLAY PROPERTIES OF SHARED DISPLAY WINDOW IN SHARED DISPLAY WINDOW ENVIRONMENT

BACKGROUND OF THE INVENTION

1. Field of the Invention

The present invention relates generally to the data processing field and, more particularly, to a computer implemented method, system and computer usable program code for enabling a participant in a shared display window environment to manage display properties of a shared display window on the participant's video display terminal.

2. Description of the Related Art

In a shared display window environment, for example, a Sametime Meeting or a Remote Desktop meeting, a meeting host typically controls what is displayed on video display terminals being used by meeting participants. This can present difficulties to individual participants. For example, a participant may arrive a few minutes late to a meeting, and a document that is currently being displayed may be positioned in such a manner that its name is obscured preventing the participant from identifying the document. In such a situation, it would be useful for the participant to have the ability to reposition the document being displayed on the participant's video display terminal so that its title will become visible.

Also, the meeting host might be displaying several documents simultaneously, and a participant might wish to reorganize or otherwise display the documents on the participant's video display terminal in a manner that is more useful to the participant.

There is, accordingly, a need for a mechanism for enabling a participant in a shared display window environment to manage display properties of a shared display window on the participant's video display terminal.

SUMMARY OF THE INVENTION

Exemplary embodiments provide a computer implemented method, system and computer usable program code for managing display properties of a shared display window in a shared display window environment, wherein the shared display window environment includes a host for managing display properties of shared display windows in the shared display window environment, and at least one user for receiving shared display windows on a user display. A computer implemented method for managing display properties of a shared display window in a shared display window environment, wherein the shared display window environment includes a host for managing display properties of shared display windows in the shared display window environment, and at least one user for receiving shared display windows on a user display includes, in response to a request of a user of the at least one user, detaching at least one shared display window from the shared display window environment, and enabling the requesting user to manage display properties of the detached at least one shared display window on the user display of the requesting user independent of the shared display window environment.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
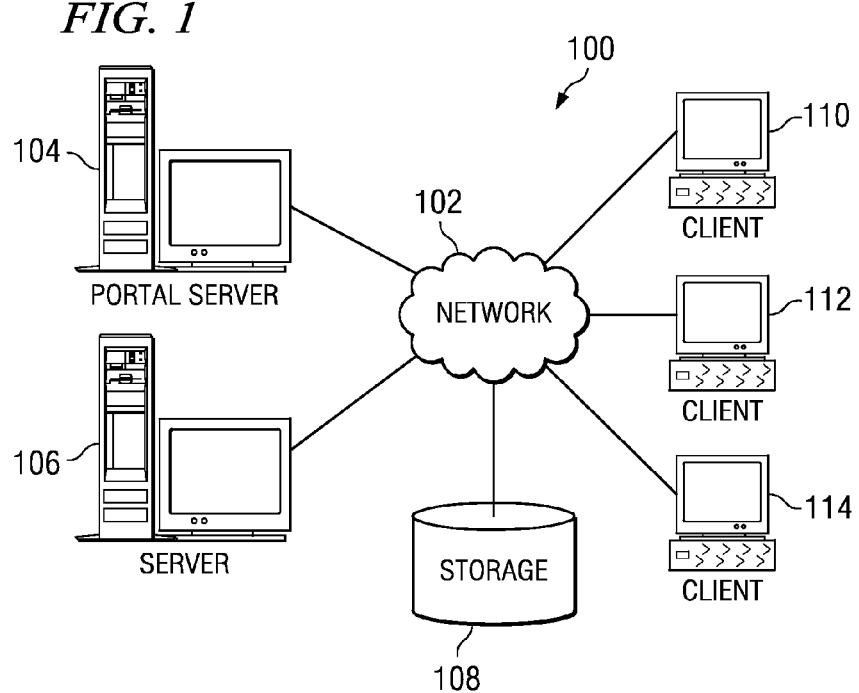
FIG. 1 depicts a pictorial representation of a network of data processing systems in which illustrative embodiments may be implemented.
Figure 2:
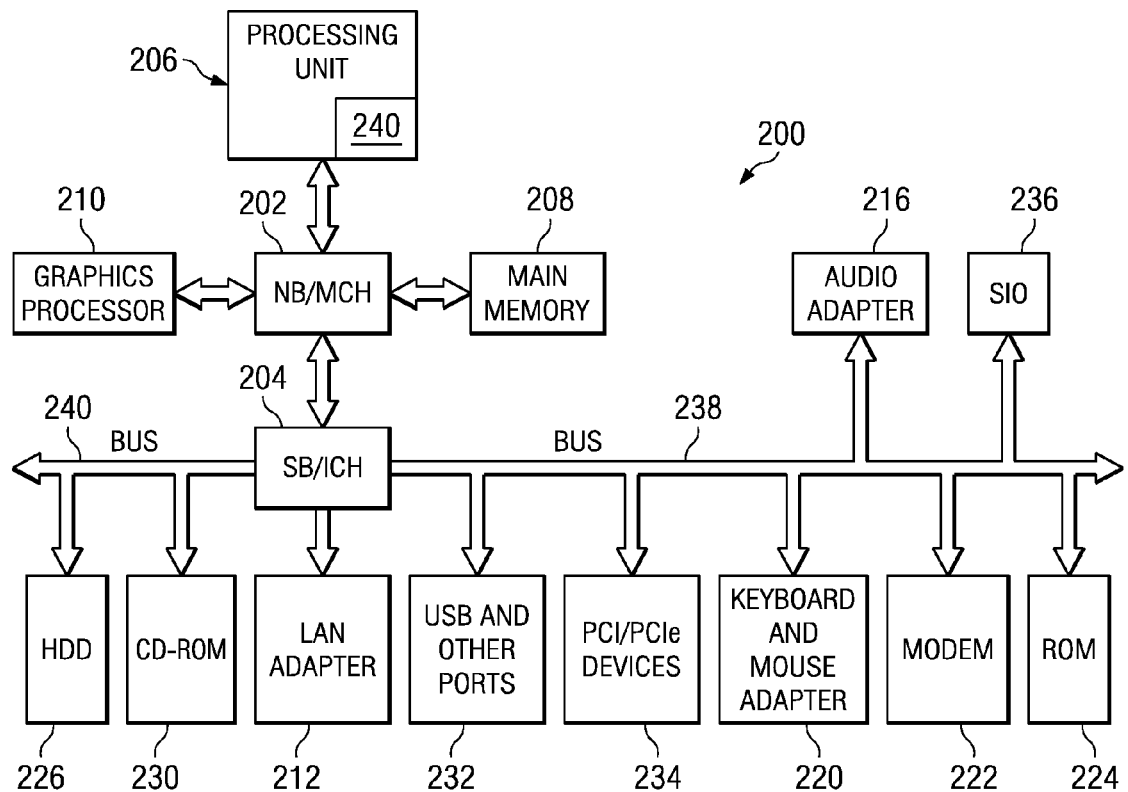
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a world-wide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Exemplary embodiments provide a computer implemented method, system and computer usable program code for managing display properties of a shared display window in a shared display window environment, wherein the shared display window environment includes a host for managing display properties of shared display windows in the shared display window environment, and at least one user for receiving shared display windows on a user display. In accordance with an exemplary embodiment, in response to a user request, at least one shared display window is detached from the shared display window environment, and the user is enabled to manage display properties of the detached at least one shared display window on the user's video display terminal independent of the shared display window environment.

In accordance with an exemplary embodiment, a shared display window includes a shared display window control mechanism controllable by a user, for example, via an icon on the shared display window, to detach the shared display window from the shared display window environment, and to enable the user to independently manage display properties of the detached shared display window on the user's video display terminal without interfering with the shared display window environment.

Figure 3:
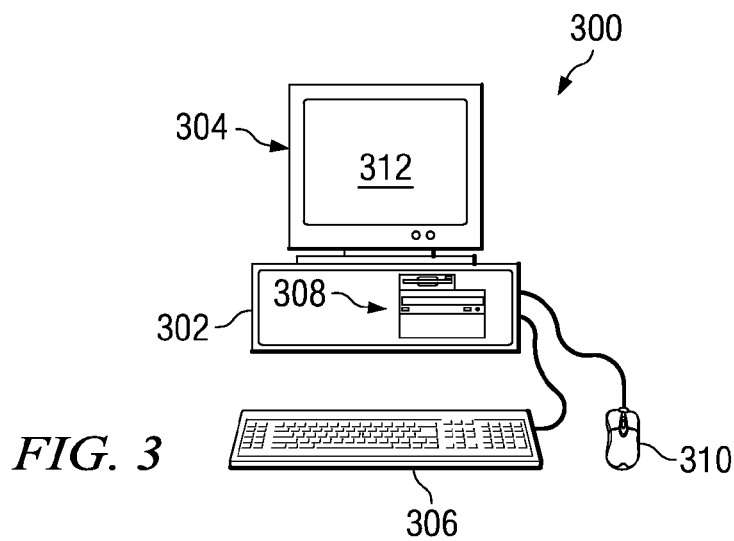
FIG. 3 is a pictorial representation of a data processing system in which exemplary embodiments may be implemented.

FIG. 3 is a pictorial representation of a data processing system in which exemplary embodiments may be implemented. Computer 300 includes system unit 302, video display terminal 304 having display screen 312, keyboard 306, storage devices 308, which may include floppy drives and other types of permanent and removable storage media, and mouse 310. Additional input devices such as a joystick, a touchpad, a touch screen, a trackball, and a microphone may be included with personal computer 300.

Computer 300 may be implemented as one of clients 110, 112 and 114 in FIG. 1, or as data processing system 200 in FIG. 2. Although the depicted representation shows a personal computer, other embodiments may be implemented in other types of data processing systems. Computer 300 also preferably includes a graphical user interface (GUI) that may be implemented by means of systems software residing in computer readable media in operation within computer 300.

Figure 4:
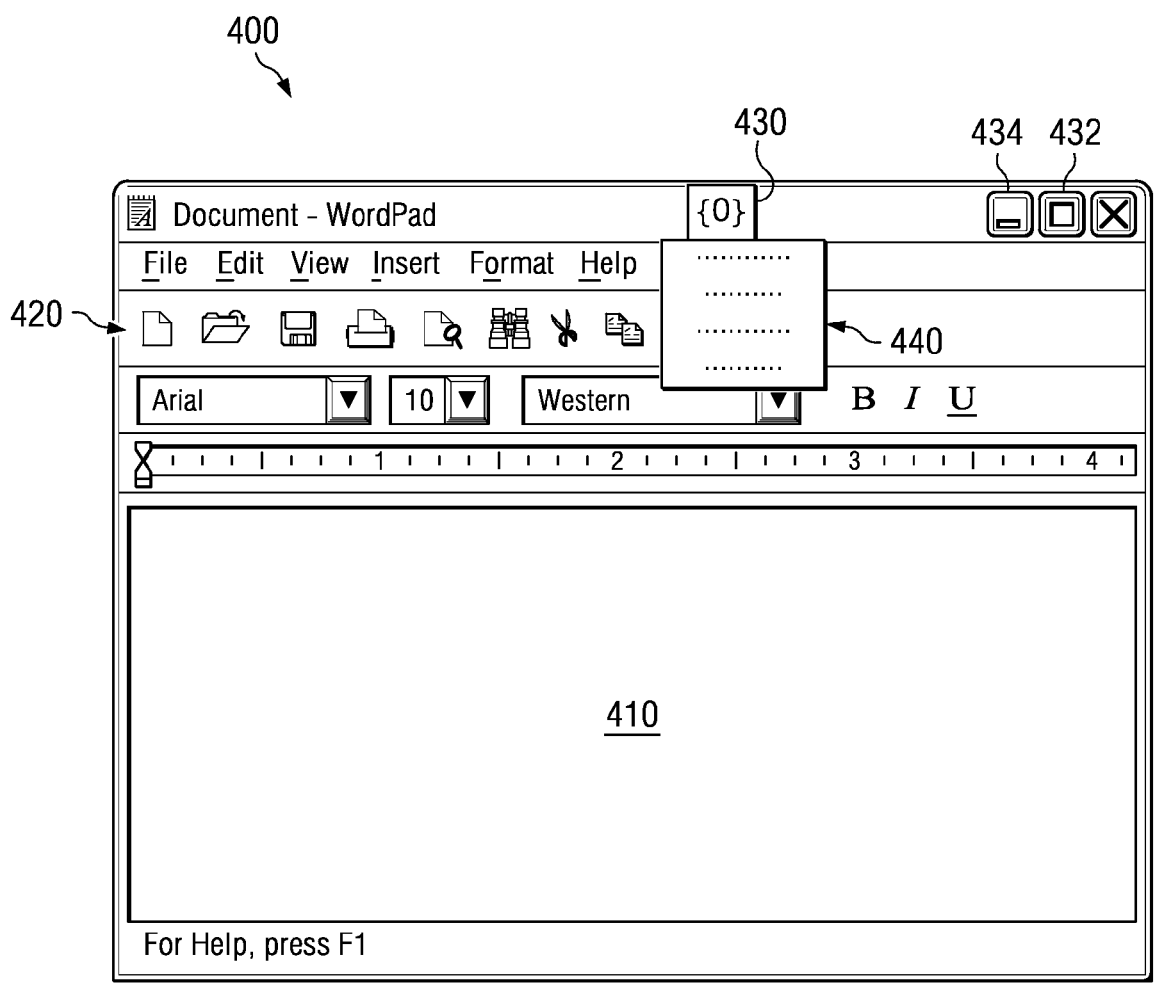
FIG. 4 illustrates a shared display window of a shared display window environment according to an exemplary embodiment.

FIG. 4 illustrates a shared display window of a shared display window environment according to an exemplary embodiment. The shared display window is generally designated by reference number 400, and includes window display area 410, and window control area 420. In the exemplary embodiment illustrated in FIG. 4, display window 400 comprises a display window generated by a Microsoft® Windows® operating system, however, it should be understood that this is intended to be exemplary only as display windows according to exemplary embodiments are not limited to display windows provided by any particular operating system.

In a shared display window environment, a host moderator typically controls what is displayed on the display screen of the video display terminal for each meeting participant (also referred to herein as a "user"). In particular, in a shared display window environment, the moderator may share several display windows with users, however, only a single shared display window, or, perhaps, a small number of shared display windows, may have focus at any particular time. Specifically, the moderator will maximize one or more primary shared display windows at a particular time thus hiding the display of other shared display windows. Examples of a shared display window environment include a Sametime Meeting or a Remote Desktop meeting.

In a shared display window environment, however, a user may wish to have the ability to manage display properties of the shared display window display on his/her own video display terminal independent of the shared display window environment. For example, a user may wish to organize shared display windows on the user's video display terminal in a manner that is more useful to the user, for example, to permit easy comparison of the subject matter of different display windows, or to change the size of one or more of the shared display windows on the video display terminal so as to make other shared display windows easier to view.

In accordance with an exemplary embodiment, a shared display window control mechanism is associated with a shared display window to enable a user to detach the shared display window from the shared display window environment and to enable the user to control display properties of the detached shared display window independent of the shared display window environment. According to an exemplary embodiment, the shared display window control mechanism, schematically illustrated by reference number 240 in FIG. 2, is controllable by a user, for example, via a visual display on the shared display window, to detach the shared display window from the shared display window environment. More particularly, as shown in FIG. 4, a visual display in the form of icon 430 is located in control area 420 of shared display window 400. Icon 430 can be "clicked on" by a user to detach shared display window 400 from a shared display window environment, and to enable the user to manage display properties of the detached shared display window in a desired manner.

According to an exemplary embodiment, a user operates shared display window control mechanism 240 by moving a curser to icon 430, for example, using a mouse such as mouse 310 in FIG. 3, or another input device, and then clicking on the icon. Clicking on icon 430 detaches shared display window 400 from the shared display window environment, and also enables the user to control display properties of the detached shared display window. In particular, in accordance with an exemplary embodiment, shared display window control mechanism 240 is preset with a default condition that enables the user to manage the display of the detached shared display window in various ways including, for example, moving the detached shared display window to different locations on the display screen of the video display terminal, resizing the shared display window, and maximizing or minimizing the shared display window. These control activities can be performed in the usual manner by operating the various controls on window display 420 including maximize button 432 and minimize button 434. It should be understood, however, that these control activities are intended to be exemplary only as the default setting can be designed to enable different or fewer actions to be taken by the user.

In accordance with a further exemplary embodiment, icon 430 can also be operated by the user to reattach a detached display window to the shared display window environment at the end of a meeting or at any time during the meeting. This can be achieved, for example, by again clicking on icon 430 using a mouse or other input device. The shared display window control mechanism can be set to a default setting to, for example, reattach the shared display window to the shared display window environment at its original location. Alternatively, the manner in which the shared display window is reattached to the shared display window environment can be selected by the user.

In particular, in accordance with a further exemplary embodiment, a list of possible reattachment options may be provided to the user in a drop down menu 440 enabled by pressing and holding down the mouse button with the cursor on icon 430, by right clicking the mouse with the cursor on icon 430, or in another manner. The drop down menu 440 can include a plurality of options selectable by the user. Among the list of possible reattachment options that may be displayed in drop down menu 440 include:

1. The detached window is reattached to the shared display window environment in its original location (the default setting).
2. The detached window is reattached to the shared display window environment in a location specified by the shared display window environment host (e.g. to a location to which the display window was moved by the host during the meeting).
3. The detached window is reattached to the shared display window environment in a user specified location and condition. For example, the user might specify that the display window be reattached:
   a. In a minimized state
   b. In a maximized state
   c. In a user specified window display order (for example, to give preference to a particular window when a plurality of windows are being displayed simultaneously)
   d. With the visual display of a particular window suppressed (for example, if the user does not want to view a shared document but, instead, to view a local copy of the shared document).

In general, exemplary embodiments provide a user with substantial flexibility and freedom to manage display properties of one or more shared display windows on a user display in a manner that is helpful to the user and that does not interfere with the shared display window environment.

Figure 5:
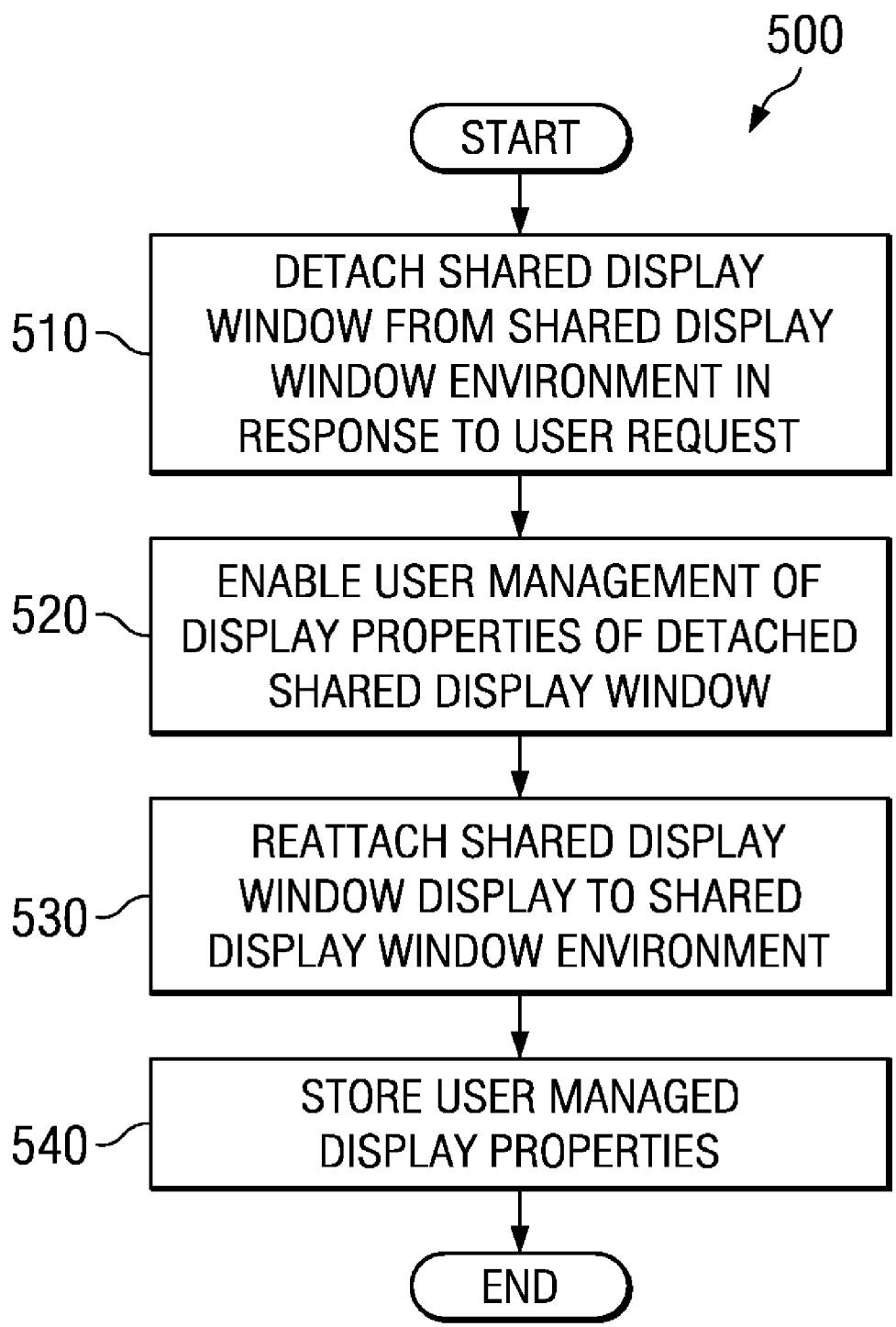
FIG. 5 is a flowchart that illustrates a method for managing display properties of a shared display window of a shared display window environment according to an exemplary embodiment.

FIG. 5 is a flow chart that illustrates a method for managing a display window in a shared display window environment according to an exemplary embodiment. The method is generally designated by reference number 500, and begins by, in response to a user request, detaching at least one shared display window from a shared display window environment (Step 510). As described above, the user can indicate the request by clicking on an icon on the shared display window. After the at least one display window is detached, the user is enabled to manage display properties of each of the detached at least one shared display window on the user's display independent of the shared display window environment (Step 520). For example, the user is enabled to manage display properties of the detached shared window display by moving, resizing, maximizing or minimizing each of the at least one detached shared display windows on the user's display.

Upon completion of the meeting, or at any time desired by the user, the detached at least one shared display window is reattached to the shared display window environment by the user (Step 530). As described above, reattachment can be in an original location of the at least one shared display window, at a location specified by the shared display window environment host or at one of a plurality of locations selected by the user.

According to a further exemplary embodiment, the display properties selected and managed by the user during a particular meeting may be stored so that they may be retrieved for use in a similar subsequent meeting (Step 540). The display properties can, for example, be saved in storage 308 in data processing system 300 illustrated in FIG. 3.

Exemplary embodiments thus provide a computer implemented method, system and computer usable program code for managing display properties of a shared display window in a shared display window environment, wherein the shared display window environment includes a host for managing display properties of shared display windows in the shared display window environment, and at least one user for receiving shared display windows on a user display. A computer implemented method for managing display properties of a shared display window in a shared display window environment, wherein the shared display window environment includes a host for managing display properties of shared display windows in the shared display window environment, and at least one user for receiving shared display windows on a user display includes, in response to a request of a user of the at least one user, detaching at least one shared display window from the shared display window environment, and enabling the requesting user to manage display properties of the detached at least one shared display window on the user display of the requesting user independent of the shared display window environment.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing display properties of a shared display window in a shared display window environment, wherein the shared display window environment includes a host for managing display properties of shared display windows in the shared display window environment, and a user for receiving corresponding shared display windows on a user display, the computer implemented method comprising:

in response to a request of the user, detaching management of display properties of at least one shared display window from the shared display window environment;

enabling the user to manage display properties of the detached at least one shared display window on the user display independent of display properties of a corresponding shared display window in the shared display window environment; and reattaching management of display properties of the detached at least one shared display window to the shared display window environment, wherein reattaching management of display properties of the detached at least one shared display window to the shared display window environment, comprises reattaching the detached at least one shared display window to the shared display window environment at a location on the user display and condition specified by the user, wherein the user specified condition comprises one of a minimized condition, a maximized condition and a display order condition.

2. The computer implemented method of claim 1, wherein enabling the user to manage display properties of the detached at least one shared display window on the user display user independent of display properties of a corresponding shared display window in the shared display window environment, comprises:

enabling the user to at least one of move, resize, maximize and minimize the detached at least one shared display window on the user display independent of the shared display window environment.

3. The computer implemented method of claim 1, wherein in response to a request of the user, detaching management of display properties of at least one shared display window from a shared display window environment comprises:

in response to the user operating a control associated with the at least one shared display window, detaching management of display properties of the at least one shared display window from the shared display window environment.

4. The computer implemented method of claim 3, wherein the control comprises a visual control associated with the at least one shared display window.

5. The computer implemented method of claim 4, wherein the visual control comprises an icon on each at least one shared display window.

6. The computer implemented method of claim 1, wherein reattaching management of display properties of the detached at least one shared display window to the shared display window environment, further comprises one of:
    reattaching the detached at least one shared display window to the shared display window environment in a location on the user display where the detached at least one shared display window on the user display was originally detached;
    reattaching the detached at least one shared display window to the shared display window environment at a location on the user display specified by the host; and.

7. The computer implemented method of claim 1, and further comprising:
    storing user managed display properties of the detached at least one shared display window.

8. A computer program product, comprising:
    a computer usable storage medium having computer usable program code encoded thereon configured for managing display properties of a shared display window in a shared display window environment, wherein the shared display window environment includes a host for managing display properties of shared display windows in the shared display window environment, and at least one user for receiving shared display windows on a user display, the computer program product comprising:
    computer usable program code configured for, in response to a request of the user, detaching management of display properties of at least one shared display window from the shared display window environment;
    computer usable program code configured for enabling the user to manage display properties of the detached at least one shared display window on the user display independent of display properties of a corresponding shared display window in the shared display window environment; and
    computer usable program code configured for reattaching management of display properties of the detached at least one shared display window to the shared display window environment, wherein the computer usable program code configured for reattaching management of display properties of the detached at least one shared display window to the shared display window environment comprises computer usable program code configured for reattaching the detached at least one shared display window to the shared display window environment at a location on the user display and condition specified by the user, wherein the user specified condition comprises one of a minimized condition, a maximized condition and a display order condition.

9. The computer program product of claim 8, wherein the computer usable program code configured for enabling the user to manage display properties of the detached at least one shared display window on the user display independent of the shared display window environment, comprises:
    computer usable program code configured for enabling the user to at least one of move, resize, maximize and minimize the detached at least one shared display window on the user display independent of the shared display window environment.

10. The computer program product of claim 8, wherein the computer usable program code configured for, in response to a request of the user, detaching management of display properties of at least one shared display window from a shared display window environment, comprises:
    computer usable program code configured for, in response to the requesting user operating a control associated with the at least one shared display window, detaching management of display properties of the at least one shared display window from the shared display window environment.

11. The computer program product of claim 10, wherein the control comprises an icon on the at least one shared display window.

12. The computer program product of claim 8, and further comprising:
    computer usable program code configured for reattaching management of display properties of the detached at least one shared display window to the shared display window environment, wherein the computer usable program code configured for reattaching management of display properties of the detached at least one shared display window to the shared display window environment further comprises one of:
    computer usable program code configured for reattaching the detached at least one shared display window to the shared display window environment in a location on the user display where the detached at least one shared display window on the user display was originally detached; and
    computer usable program code configured for reattaching the detached at least one shared display window to the shared display window environment at a location on the user display specified by the host.

13. The computer program product of claim 8, and further comprising:
    computer usable program code configured for storing user managed display properties of the detached at least one shared display window.

14. A shared display window control mechanism for managing display properties of a shared display window in a shared display window environment, wherein the shared display window environment includes a host for managing display properties of shared display windows in the shared display window environment, and a user for receiving corresponding shared display windows on a user display, comprising:
    a bus;
    a communications unit connected to the bus;
    a memory connected to the bus, wherein the memory includes a set of computer usable program code; and
    a processor unit connected to the bus, wherein the processor unit executes the set of computer usable program code to perform:
    responsive to a request of the user, detaching, by a detaching mechanism, management of display properties of at least one shared display window from the shared display window environment;
    enabling, by an enabling mechanism, the user to manage display properties of the detached at least one shared display window on the user display independent of display properties of a corresponding shared display window in the shared display window environment; and reattaching, by a reattaching mechanism, management of display properties of the detached at least one shared display window to the shared display window environment, wherein reattaching, by the reattaching mechanism, management of display properties of the detached at least one shared display window to the shared display window environment comprises reattaching, by the reattaching mechanism, the detached at least one shared display window to the shared display window environment at a location on the user display and condition specified by the user, wherein the user specified condition comprises one of a minimized condition, a maximized condition and a display order condition.

15. The shared display window control mechanism of claim 14, wherein the enabling mechanism comprises:
a mechanism for enabling the user to at least one of move, resize, maximize and minimize the detached at least one shared display window on the user display independent of the shared display window environment.

16. The shared display window control mechanism of claim 14, wherein the detaching mechanism comprises an icon on the shared display window.

17. The shared display window control mechanism of claim 14, and further comprising:
reattaching, by a reattaching mechanism, management of display properties of the detached shared display window to the shared display window environment, wherein reattaching, by the reattaching mechanism, management of display properties of the detached at least one shared display window to the shared display window environment further comprises one of:
reattaching, by the reattaching mechanism, the detached at least one shared display window to the shared display window environment in a location on the user display where the detached at least one shared display window on the user display was originally detached; and
reattaching, by the reattaching mechanism, the detached at least one shared display window to the shared display window environment at a location on the user display specified by the host.

18. The shared display window control mechanism of claim 14, and further comprising:
storing user managed display properties of the detached at least one shared display window.

* * * * *